United States Patent
May et al.

(10) Patent No.: US 10,604,226 B2
(45) Date of Patent: Mar. 31, 2020

(54) SHIELDED STRUCTURE FOR AIRCRAFT

(71) Applicant: Bell Helicopter Textron Inc., Fort Worth, TX (US)

(72) Inventors: Carl May, Mansfield, TX (US); James D. Hethcock, Jr., Colleyville, TX (US); John R. McCullough, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 259 days.

(21) Appl. No.: 15/488,217

(22) Filed: Apr. 14, 2017

(65) Prior Publication Data

US 2018/0297685 A1 Oct. 18, 2018

(51) Int. Cl.
*B64C 1/12* (2006.01)
*B32B 3/12* (2006.01)
*B32B 5/18* (2006.01)
*B32B 5/24* (2006.01)

(52) U.S. Cl.
CPC ............ *B64C 1/12* (2013.01); *B32B 3/12* (2013.01); *B32B 5/18* (2013.01); *B32B 5/245* (2013.01); *B32B 2260/023* (2013.01); *B32B 2260/046* (2013.01); *B32B 2262/101* (2013.01); *B32B 2262/106* (2013.01); *B32B 2605/18* (2013.01)

(58) Field of Classification Search
CPC ........................................... B64C 1/12
USPC ........................................... 244/133
See application file for complete search history.

(56) References Cited

U.S. PATENT DOCUMENTS

| | | | | |
|---|---|---|---|---|
| 4,453,277 A | * | 6/1984 | Durand | A42B 3/14 |
| | | | | 2/416 |
| 6,655,633 B1 | * | 12/2003 | Chapman, Jr. | B29C 53/60 |
| | | | | 244/123.9 |
| 7,293,737 B2 | * | 11/2007 | Engwall | B29C 33/485 |
| | | | | 242/590 |
| 9,987,772 B1 | * | 6/2018 | Shareef | B29C 70/56 |
| 2004/0028877 A1 | * | 2/2004 | Itoh | B29C 73/04 |
| | | | | 428/118 |
| 2015/0223546 A1 | * | 8/2015 | Cohen | A42B 3/063 |
| | | | | 2/412 |
| 2017/0016982 A1 | * | 1/2017 | Finck | G01S 7/521 |

* cited by examiner

*Primary Examiner* — Claude J Brown
(74) *Attorney, Agent, or Firm* — Lightfoot & Alford PLLC

(57) ABSTRACT

An aircraft includes a composite structure, comprising an outer skin formed from a composite material and having a first thickness, an inner skin formed from a composite material and having a second thickness, the second thickness being greater than the first thickness, and a core structure positioned between the inner and outer skins to increase bending stiffness of the composite structure. During use a structural load carried by the inner skin exceeds a structural load carried by the outer skin.

20 Claims, 4 Drawing Sheets

SHIELDED STRUCTURE FOR AIRCRAFT

BACKGROUND

1. Technical Field

This disclosure relates generally to a composite structure for use in the construction of aircraft and aircraft components.

2. Background of the Related Art

Composite structures are often arranged into a "sandwich" structure, which provides considerable stiffness-to-weight ratios and strength-to-weight ratios. A lightweight core is positioned between inner and outer skins, each of which carry a substantial portion of any axial, bending, or shear load applied to the structure. The integrity of these composite structures may be compromised through damage to one or both skins, and an exposed outer skin may require frequent inspections and repairs due to in-service damage.

DETAILED DESCRIPTION

Figure 1:
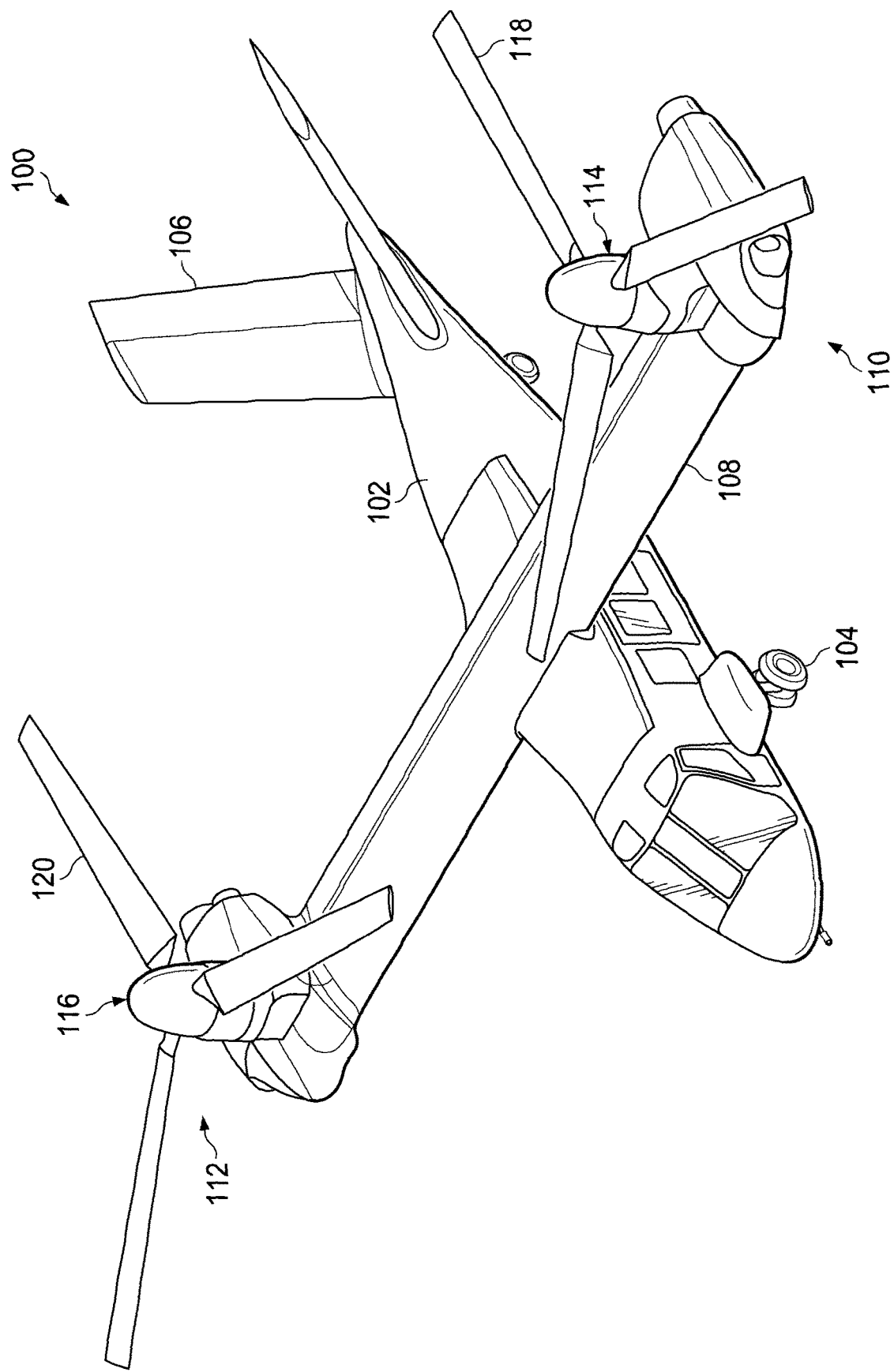
FIG. 1 is an oblique view of an aircraft comprising composite structures according to this disclosure.

In this disclosure, reference may be made to the spatial relationships between various components and to the spatial orientation of various aspects of components as items are depicted in the attached drawings. However, as will be recognized by those skilled in the art after a complete reading of this disclosure, items described herein may be positioned in any desired orientation. Thus, the use of terms such as "above," "below," "upper," "lower," "inner," "outer," or other like terms, to describe a spatial relationship between various components or to describe the spatial orientation of aspects of such components should be understood to describe a relative relationship between the components or a spatial orientation of aspects of such components, respectively, as the items described herein may be oriented in any desired direction. In the figures, like reference numerals identify similar or identical elements.

Although illustrated in use with a tiltrotor aircraft, the principles of this disclosure are equally applicable to other types of aircraft, and the term "aircraft" should be understood to include other types of aircraft, such as, for example, helicopters, fixed-wing aircraft, drones, etc., whether commercial, military, or otherwise.

This disclosure divulges a new composite structure, in which a thinner outer skin and a thicker inner skin enclose a core structure, which may comprise, for example, one or a combination of features, such as foam, honeycomb, or similar material intended to separate the skins and provide a shear load path between the skins. The thinner outer skin and core mostly serve in a stabilizing structural capacity as stiffening members for the primary, load-carrying inner skin, thereby resisting buckling due to compression or shear loads applied to the structure. This allows the outer skin to sustain local damage from expected impacts (such as, for example, dropped tools, hail, etc.) without losing its capability to stabilize the structure. Only higher-energy damage, accumulation of enough lower-energy damage to affect the stabilizing function of the outer skin, or damage penetrating the outer skin that would affect aerodynamic smoothness would require repair. In addition, the outer skin and core serve as a buffer to absorb energy from impacts, thereby protecting the primary inner skin from damage. Shielding the inner skin from damage potential will allow the use of higher strain allowables, resulting in weight savings for the structure. The notched strain allowables of the outer skin can be matched to the unnotched strain allowables of the structural inner skin by softening the laminate of the outer layer. One method of softening this outer layer could be through tailored orientation of the ply-fiber directions in relation to the primary load direction.

The composite structure according to this disclosure provides the ability to precisely target the desired damage threshold to customer requirements. For example, the thickness of both the outer skin and the core can be sized to visibly indicate damage in an impact-energy range equal to expected threat levels, and providing for visual inspection and reduced need for repair provide for savings in operating costs.

During a damage assessment, in those instances where visual confirmation of damage is unavailable, thermography or other methods may be employed to visualize damaged portions of the outer skin, core, and/or bond points between the skins and core. During a thermographic scan, damaged areas can be identified by localized thermal discontinuities and repaired as required.

The toughness of the outer skin may be tailored with additional adhesive plies or other methods, such as, for example, by increasing the adhesive fillet gap from skin to core components. Additionally, a honeycomb core can be configured specifically for energy absorption, and this can be accomplished through, for example, using an open weave architecture preferably utilizing a thermoplastic resin. Foam added to the core in areas of high impact threat levels further enhance the protection of the primary inner skin and minimize resulting damage to the core and outer skin.

FIG. 1 illustrates a tiltrotor aircraft 100 that includes fuselage 102, landing gear 104, tail member 106, wing 108, and propulsion systems 110, 112. Each propulsion system 110, 112 includes a fixed engine (not shown) and rotatable proprotors 114, 116. Proprotors 114, 116 are adjustable in position and include a plurality of rotor blades 118, 120, respectively, the pitch of which can be selectively controlled to vary the direction and amount of thrust provided by proprotors 114, 116.

Figure 2:
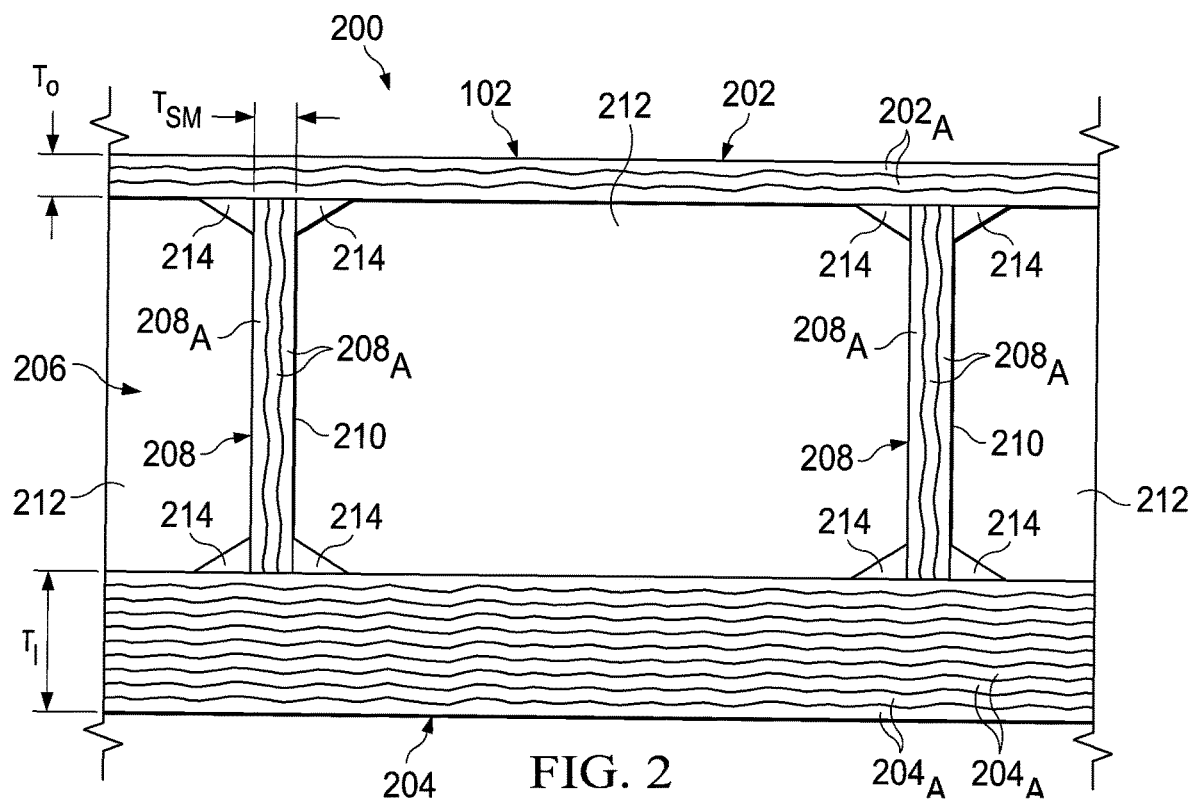
FIG. 2 is a side cross-sectional view of a portion of a composite structure according to this disclosure.

Referring now also to FIG. 2, aircraft 100 includes at least one composite structure 200 with an outer skin 202, an inner skin 204, and a core structure 206 that is positioned between skins 202, 204. Although discussed below in connection with fuselage 102, it should be appreciated that composite structure 200 may be employed in connection with any suitable exterior structure of aircraft 100, such as, for example, tail member 106 or wing 108.

Skins 202, 204 are configured and dimensioned to carry the load applied to composite structure 200 during use and to provide overall structural rigidity. In the particular embodiment illustrated in FIG. 2, each of skins 202, 204 is formed through a lamination process by which individual plies of material are cured together. Specifically, outer skin 202 includes plies $202_A$ defining an overall thickness $T_O$, and inner skin 204 includes plies $204_A$ defining an overall thickness $T_I$.

As seen in FIG. 2, the number of plies $204_A$ used in fabrication of inner skin 204 exceeds the number of plies $202_A$ used in fabrication of outer skin 202, such that thickness $T_I$ of inner skin 204 exceeds the thickness $T_O$ of outer skin 202. Due to the difference in thicknesses $T_O$, $T_I$ of skins 202, 204, the majority of any load, e.g., in-flight stresses, applied to composite structure 200 is carried by inner skin 204. However, by varying the number of plies $202_A$, $204_A$ used in fabrication of skins 202, 204, respectively, the percentage of an applied load carried by each skin 202, 204 can be tailored for each application.

With continued reference to FIG. 2, core structure 206 spaces skins 202, 204 from each other, thereby increasing the moment of inertia of composite structure 200 by spacing mass from the neutral axis, thus increasing the bending stiffness of skins 202, 204 to inhibit deflection of composite structure 200 under an applied load. Although shown as including a plurality of spacers 208 in the particular embodiment shown in FIG. 2, it should be appreciated that core structure 206 may include any material or structure suitable for intended purposes of: (i) spacing skins 202, 204 from each other; (ii) transmitting shear between skins 202, 204; and/or (iii) increasing through-thickness shear rigidity of composite structure 200 to stabilize skins 202, 204 and increase the tolerable load on skins 202, 204.

In the embodiment illustrated in FIG. 2, spacers 208 are configured as webs 210 formed through a lamination process by which individual plies of material are cured or bonded together. Specifically, spacers 208 include plies $208_A$, which define an overall thickness $T_{SM}$ and are connected to skins 202, 204 so as to define internal hollow cavities 212.

Core structure 206 may be secured to skins 202, 204 in any manner suitable for use in connection with aircraft manufacturing. For example, in one embodiment, core structure 206 may be bonded to skins 202, 204 using an adhesive. Alternatively, spacers 208 and skins 202, 204 may be co-cured or adhered together at bond points 214.

Skins 202, 204 and core structure 206 may all be formed from the same material, e.g., a carbon- or glass-fiber reinforced plastic. Alternatively, skins 202, 204 and core structure 206 may be formed from dissimilar composite materials. For example, in one embodiment, skins 202, 204 may include carbon-fiber reinforced plastic, and core structure 206 may include glass-fiber reinforced plastic. Alternatively, core structure 206 may be formed from unreinforced plastic, while the skins 202 and 204 are formed from fiber-reinforced plastic.

Dependent upon the particular application in which composite structure 200 may be employed, during manufacture, one or more additives may be incorporated or applied into the reinforced plastics or adhesive, if the plastic resin is of a thermoplastic nature, to allow for localized induction heating. For example, a mesh (not shown) and/or particles (not shown) may be incorporated into or applied to the material(s) used to fabricate skins 202, 204 and/or the material used to fabricate core structure 206 and/or the material used to fabricate the bonding adhesive at bond points 214. The ability to cause localized heating may allow for strengthened and/or toughened bondlines and facilitate repair of composite structure 200. For example, when damage to outer skin 202 is sustained, specific sections of composite structure 200 may be heated and softened, thereby permitting either localized or large scale separation of outer skin 202 from core structure 206. The damaged portion(s) of outer skin 202 and/or core structure 206 can then be removed and repaired or replaced.

Figure 3:
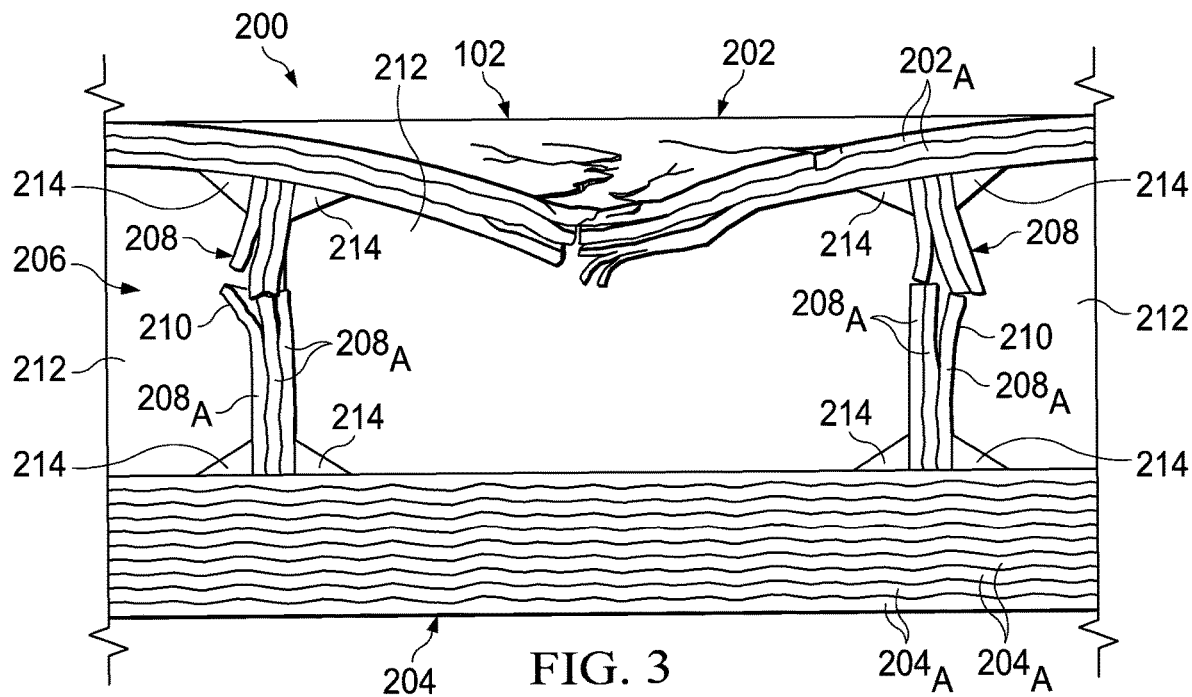
FIG. 3 is a side cross-sectional view of a portion of the composite structure of FIG. 2 after sustaining damage.

With reference now to FIG. 3 as well, when subjected to external forces, such as in-flight ballistic impact, tools dropped during maintenance, or extreme weather conditions, e.g., hail, outer skin 202 absorbs impact and dissipates the energy, thereby protecting inner skin 204 and maintaining the structural integrity and operability of composite structure 200. The impact energy applied to inner skin 204 is reduced and distributed, thus greatly reducing the effect on inner skin 204. This allows inner skin 204 to remain relatively unaffected by the applied impact energy, as can be appreciated through reference to FIG. 3. Because inner skin 204 carries most of the structural loads, the formation of weakened areas and stress concentrations in outer skin 202 has a minimum effect on composite structure 200. Outer skin 202 is specifically designed, configured, and dimensioned to sustain damage, e.g., denting or localized delamination, without compromising the global functionality of composite structure 200. For example, given the relatively minor load carried by the outer skin 202, damage of a certain size over a certain percentage of the outer skin 202 can be tolerated without undermining the structural integrity or function of the composite structure 200. Consequently, repair is not required until higher-energy damage, e.g., damage that actually penetrates the outer skin 202, is sustained, or until such time that relatively minor damage has accumulated to a degree significant enough to compromise aero-smoothness of outer skin 202 or compromise the overall functionality of composite structure 200.

It is envisioned that the configuration, dimensions, and structure of composite structure 200 may be altered to suit a particular design purpose. For example, by varying the respective thicknesses $T_O$, $T_I$ of skins 202, 204 and the degree to which skins 202, 204 are spaced from each other by core structure 206, composite structure 200 may be designed to carry a particular load in particular conditions. For example, in the context of a military application, it may be desirable to increase the thicknesses $T_O$, $T_I$ and/or the spacing of skins 202, 204 when compared to a commercial application.

Figure 4:
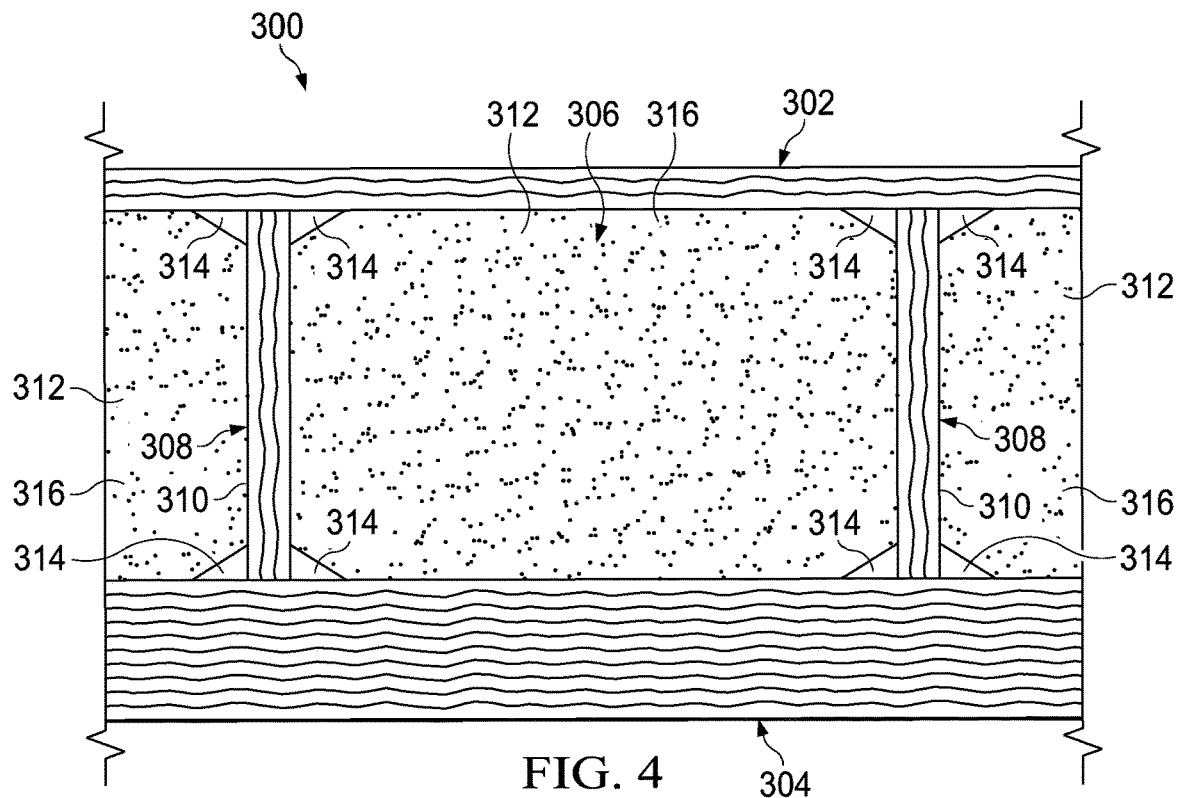
FIG. 4 is a side cross-sectional view of a portion of an alternative embodiment of a composite structure according to this disclosure.

With reference now to FIG. 4, an alternative embodiment of the composite structure will be described, which is identified by reference character 300. Composite structure 300 is identical to composite structure 200 described above with respect to FIG. 2 but for the distinctions discussed below. Accordingly, in the interest of brevity, composite structure 300 will only be discussed in detail to the extent necessary to identify any differences in structure and/or function.

Composite structure 300 includes an outer skin 302, a thicker inner skin 304 configured to carry the majority of a load applied to structure 300, and a core structure 306. Core structure 306 includes one or more spacers 308 configured as webs 310 that are connected to skins 302, 304 and define internal cavities 312. Whereas internal cavities 212 (FIG. 2) discussed above in connection with the composite structure 200 are illustrated and described as being devoid of any filler or material, cavities 312 include a foam 316. Suitable materials for use in fabrication of foam 316 include, but are not limited to, polystyrene, polyurethane, PVC (polyvinyl chloride), PMI (polymethacrylimide), etc.

As discussed above, spacers 308 and foam 316 may be secured to skins 302, 304 in any suitable manner. For example, foam 316 may be secured to spacers 308 and/or skins 302, 304 using an adhesive or using inherent adhesive characteristics of a pourable and/or expanding foam, such as polyurethane, and spacers 308 may be co-cured or adhered to skins 302, 304 at bond points 314.

Figure 5:
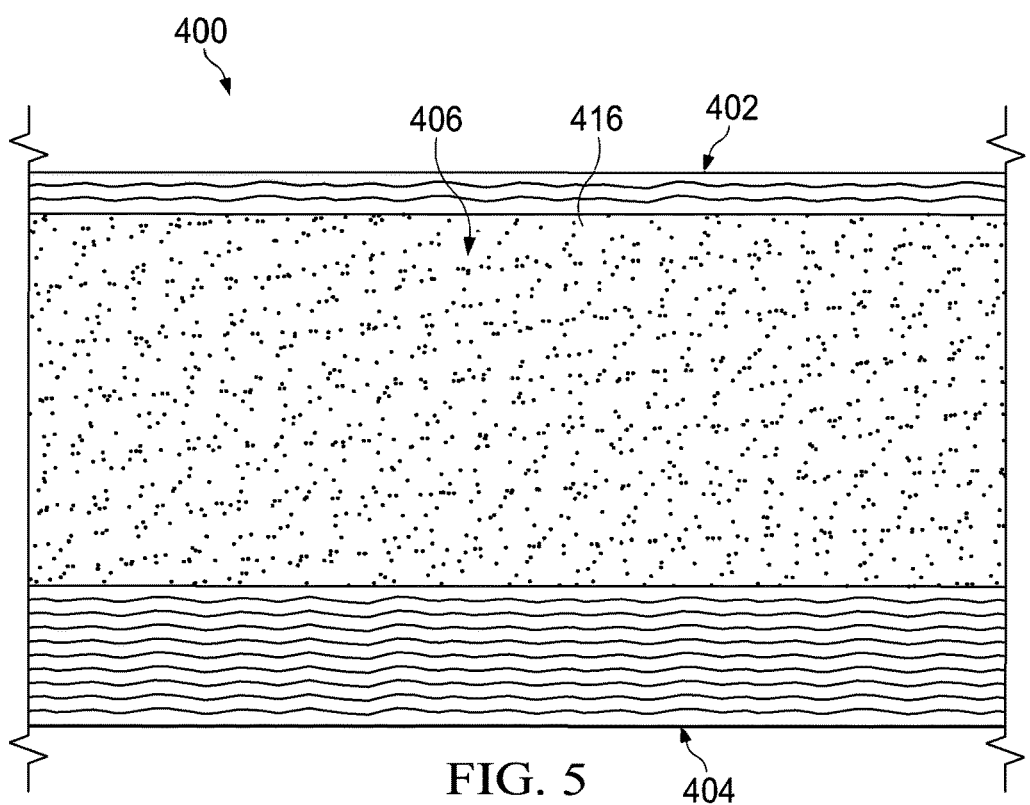
FIG. 5 is a side cross-sectional view of a portion of another alternative embodiment of a composite structure according to this disclosure.

FIG. 5 illustrates an alternative embodiment of the composite structure, which is identified by reference character 400. Composite structure 400 is identical to composite structure 300 described above with respect to FIG. 4 but for the distinctions discussed below. Accordingly, in the interest of brevity, composite structure 400 will only be discussed in detail to the extent necessary to identify any differences in structure and/or function.

Composite structure 400 includes an outer skin 402, a thicker inner skin 404 configured to carry the majority of a load applied to structure 400, and a core structure 406, but is devoid of spacers or webs described in connection with the preceding embodiments. As discussed above, core structure 406 may include any material or structure suitable for intended purposes of: (i) spacing skins 402, 404 from each other; (ii) transmitting shear between skins 402, 404; and/or (iii) increasing through-thickness shear rigidity of composite structure 400 to stabilize skins 402, 404 and increase the tolerable load. For example, as illustrated in FIG. 5, core structure 406 may include a foam 416, as discussed above in connection with composite structure 300 seen in FIG. 4.

Figure 6:
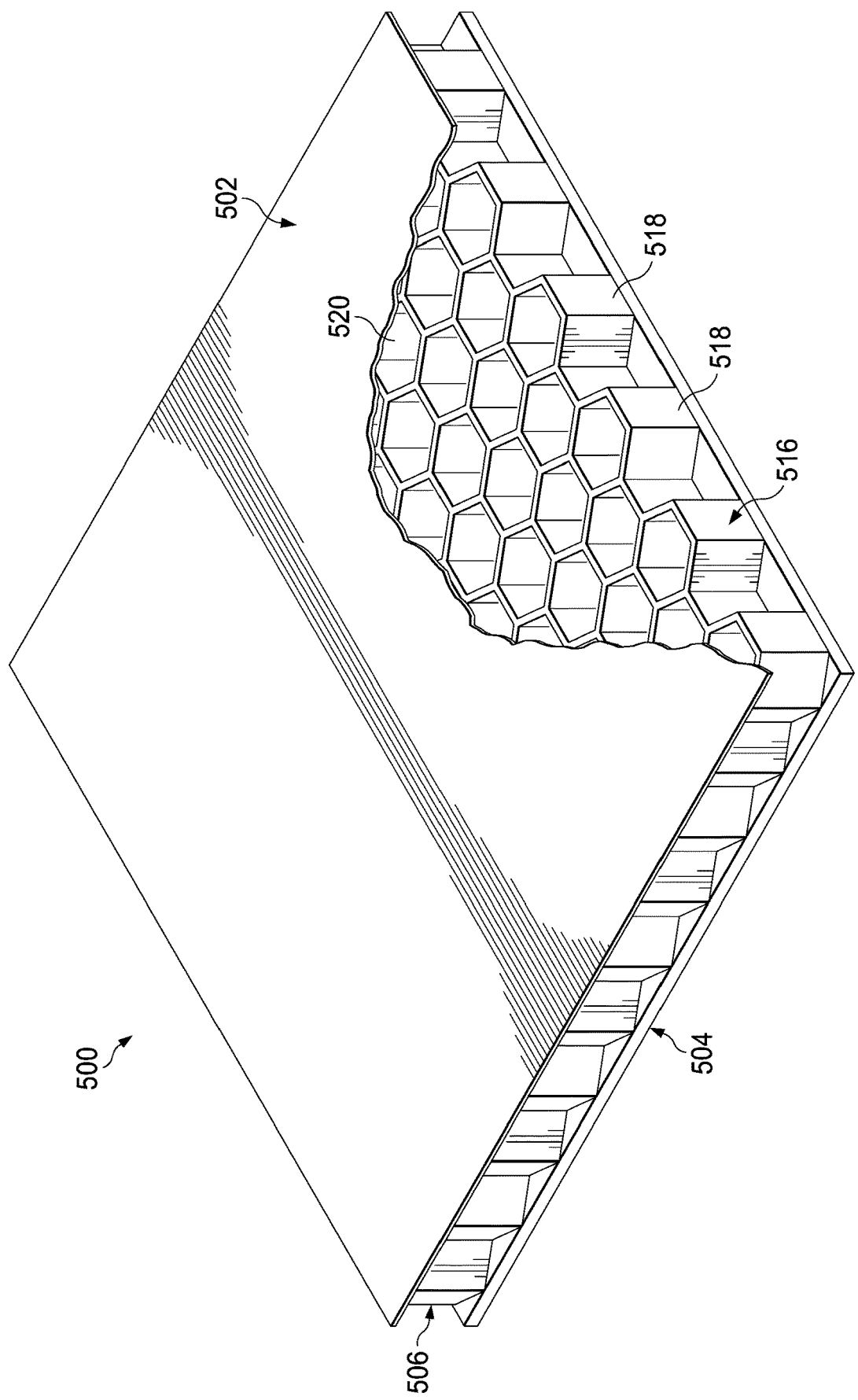
FIG. 6 is an oblique view of another alternative embodiment of a composite structure according to this disclosure.

As illustrated in FIG. 6, a composite structure 500 has an outer skin 502 (a portion shown removed), a thicker inner skin 504 configured to carry the majority of a load applied to structure 500, and a core structure 506 comprising a honeycomb 516. Honeycomb 516 includes a plurality of hexagonal members 518 defining interstices 520. Although shown in this embodiment to be of hexagonal geometry, it should be appreciated that honeycomb 516 could be of any geometry suitable for core structure 506. Honeycomb 516 may be formed from any suitable material, e.g., metallic material(s), such as titanium, or a non-metallic material, such as, for example, Kevlar, Nomex, or reinforced or unreinforced plastic. Honeycomb 516 may be formed from the same material as skins 502, 504 or honeycomb 516 and skins 502, 504 may be formed from dissimilar materials.

An advantage to using a continuous core material, such as foam 416 of structure 400 or honeycomb 516 of structure 500, is that the core material can be adhered, bonded, or cured to the inner and outer skins over large areas, increasing the transfer of shear stresses and eliminating discontinuities that may be formed at the location of spacers.

Persons skilled in the art will understand that the various embodiments of the disclosure described herein, and shown in the accompanying figures, constitute non-limiting examples of the present disclosure, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure, and will appreciate further features and advantages of the presently disclosed subject matter based on the description provided. Variations, combinations, and/or modifications to any of the embodiments and/or features of the embodiments described herein within the abilities of a person having ordinary skill in the art are also within the scope of the disclosure, as are alternative embodiments that may result from combining, integrating, and/or omitting features from any of the disclosed embodiments.

Where numerical ranges or limitations are expressly stated, such express ranges or limitations should be understood to include iterative ranges or limitations of like magnitude falling within the expressly stated ranges or limitations, e.g., from about 1 to about 10 includes 2, 3, 4, etc., and greater than 0.10 includes 0.11, 0.12, 0.13, etc. Additionally, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers, in accordance with the above discussion, is also specifically disclosed.

Use of the term "optionally" with respect to any element of a claim means that the element is required, or alternatively, the element is not required, both alternatives being within the scope of the claim. Use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

Each and every claim is incorporated as further disclosure into the specification, and the claims are embodiments of the present disclosure. Also, the phrases "at least one of A, B, and C" and "A and/or B and/or C" should each be interpreted to include only A, only B, only C, or any combination of A, B, and C.

What is claimed is:

1. An aircraft including a composite structure, the composite structure comprising:
    an outer skin formed from a fiber-reinforced plastic and having a first thickness;
    an inner skin formed from a fiber-reinforced plastic and having a second thickness, the second thickness being greater than the first thickness; and
    a core structure positioned between the inner and outer skins and secured to the inner and outer skins to increase bending stiffness of the composite structure and provide a shear load path between the inner and outer skins;
    wherein during flight of the aircraft a structural load carried by the inner skin exceeds a structural load carried by the outer skin, the outer skin and core structure stabilizing the inner skin for resisting buckling due to loads applied to the structure; and
    wherein the thickness of the outer skin and a thickness of the core structure are sized to allow for visibly indicated damage from a selected impact-energy range, thereby providing for visual inspection to determine a need for repair.

2. The aircraft of claim 1, wherein each skin is formed as a laminate.

3. The aircraft of claim 1, wherein the outer skin is formed with fibers oriented in relation to a selected load direction.

4. The aircraft of claim 1, wherein the core structure includes a plurality of spacers.

5. The aircraft of claim 1, wherein the core structure includes a plurality of spacers, the spacers, inner skin, and outer skin cooperating to define a plurality of internal cavities.

6. The aircraft of claim 1, wherein the core structure includes a plurality of spacers, the spacers, inner skin, and outer skin cooperating to define a plurality of internal cavities, the cavities being hollow.

7. The aircraft of claim 1, wherein the core structure includes a plurality of spacers, the spacers, inner skin, and outer skin cooperating to define a plurality of internal hollow cavities, the cavities containing a foam.

8. The aircraft of claim 1, wherein the core structure includes a plurality of spacers, the spacers, inner skin, and outer skin cooperating to define a plurality of internal hollow cavities, the cavities containing a honeycomb core.

9. The aircraft of claim 1, wherein the core structure includes a foam.

10. The aircraft of claim 1, wherein the core structure includes a honeycomb core.

11. The aircraft of claim 1, wherein the inner skin, the outer skin, and the core structure are configured and dimensioned such that the inner skin carries the majority of an applied load.

12. The aircraft of claim 1, wherein the aircraft further includes one or more of a fuselage, a tail member, and a wing, the composite structure being used in construction of at least one of the fuselage, the tail member, and the wing.

13. A composite structure for use in an aircraft, the composite structure comprising:
   an outer skin including a plurality of plies of fiber-reinforced plastic, the outer skin defining a first thickness;
   an inner skin including a plurality of plies of fiber-reinforced plastic, the inner skin defining a second thickness greater than the first thickness, such that a structural load carried by the inner skin exceeds a structural load carried by the outer skin; and
   a core structure secured to the inner and outer skins and providing a shear load path between the inner and outer skins, the core structure including a plurality of spacers positioned between the outer skin and the inner skin, wherein the spacers, the inner skin, and the outer skin collectively define a plurality of internal cavities;
   wherein the first thickness of the outer skin and a thickness of the core structure are sized to allow for visibly indicated damage from a selected impact-energy range, thereby providing for visual inspection to determine a need for repair.

14. The composite structure of claim 13, wherein the internal cavities are hollow.

15. The composite structure of claim 13 further including a foam positioned within the internal cavities.

16. The composite structure of claim 13 further including a honeycomb core positioned within the internal cavities.

17. A composite structure for use in an aircraft, the composite structure comprising:
   a protective outer skin including a plurality of plies of fiber-reinforced plastic laminated together so as to define a first thickness;
   a structural inner skin including a plurality of plies of fiber-reinforced plastic laminated together so as to define a second thickness, the second thickness being greater than the first thickness, such that a structural load carried by the inner skin exceeds a structural load carried by the outer skin; and
   a core structure positioned between the outer skin and the inner skin and secured to the inner and outer skins for providing a shear load path between the inner and outer skins;
   wherein the first thickness of the outer skin and a thickness of the core structure are sized to allow for visibly indicated damage from a selected impact-energy range, thereby providing for visual inspection to determine a need for repair.

18. The composite structure of claim 17, wherein the core structure includes a plurality of spacers positioned between the outer skin and the inner skin.

19. The composite structure of claim 17, wherein the core structure includes a foam.

20. The composite structure of claim 17, wherein the core structure includes a honeycomb.

* * * * *